(12) United States Patent
Kojima

(10) Patent No.: US 6,414,916 B1
(45) Date of Patent: Jul. 2, 2002

(54) RECORDING APPARATUS OF MASTER DISCS OF OPTICAL DISCS

(75) Inventor: Yoshiaki Kojima, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/339,676

(22) Filed: Jun. 24, 1999

(30) Foreign Application Priority Data

Jun. 29, 1998 (JP) .............................. 10-183073

(51) Int. Cl.[7] .................................. G11B 7/00
(52) U.S. Cl. ........................ 369/44.11; 369/44.32; 369/53.3
(58) Field of Search .................. 369/126, 44.11, 369/44.39, 53.38, 121, 101, 44.25, 44.28, 266, 53.3, 563.14, 44.32, 219, 53.19

(56) References Cited

U.S. PATENT DOCUMENTS

| | | | | |
|---|---|---|---|---|
| 4,074,313 A | * | 2/1978 | Reisner et al. ............ | 369/44.39 |
| 4,223,187 A | * | 9/1980 | Yonezawa et al. ........... | 369/121 |
| 4,725,736 A | * | 2/1988 | Crewe .......................... | 369/101 |
| 4,945,515 A | * | 7/1990 | Ooumi et al. ................ | 369/126 |
| 5,301,173 A | * | 4/1994 | Matsuda ...................... | 369/126 |
| 5,446,722 A | * | 8/1995 | Kojima et al. ............... | 369/266 |
| 5,825,730 A | * | 10/1998 | Nishida et al. ........... | 369/44.32 |
| 6,041,030 A | * | 3/2000 | Ohmi ....................... | 369/53.19 |
| 6,134,197 A | * | 10/2000 | Ishibashi et al. ......... | 369/44.32 |

* cited by examiner

*Primary Examiner*—William Korzuch
*Assistant Examiner*—Kim-Kwok Chu
(74) *Attorney, Agent, or Firm*—Sughrue Mion, PLLC

(57) ABSTRACT

A recording apparatus of a master disc of optical discs which can irradiate a recording beam to a preferable position on the master disc even when a vibration occurs in a rotary shaft to hold the master disc or when a rotational fluctuation occurs in a spindle motor. An angle position in the rotating direction of the rotary shaft and a displacement of the rotary shaft in a radial direction of the master disc are detected. Based on the angle position and the displacement, the present deviation at the present angle position from the reference position of the rotary shaft is calculated. Based on the present deviation, the irradiating spot position is adjusted.

8 Claims, 15 Drawing Sheets

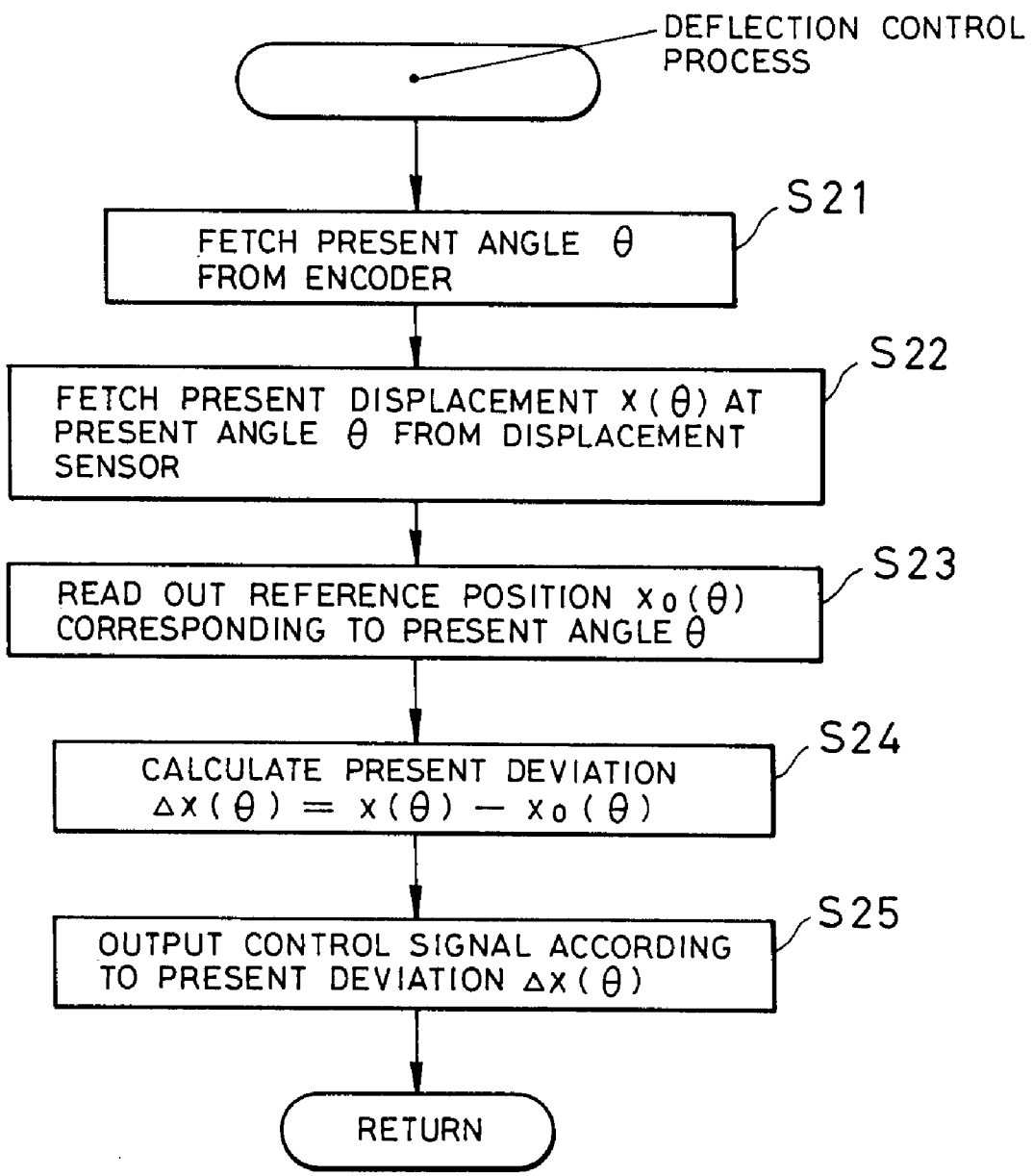

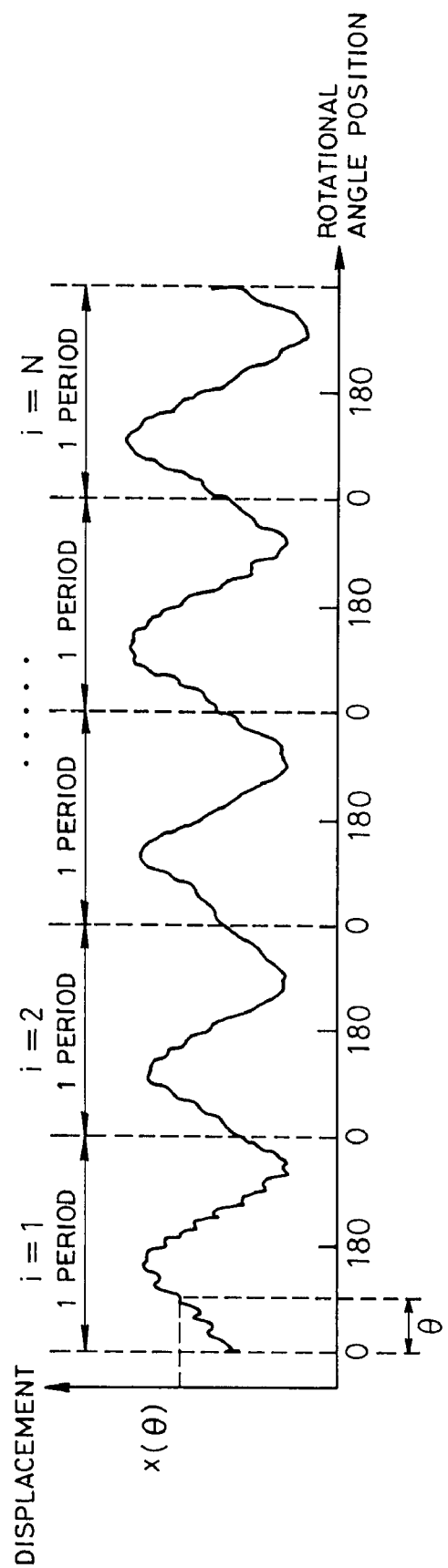

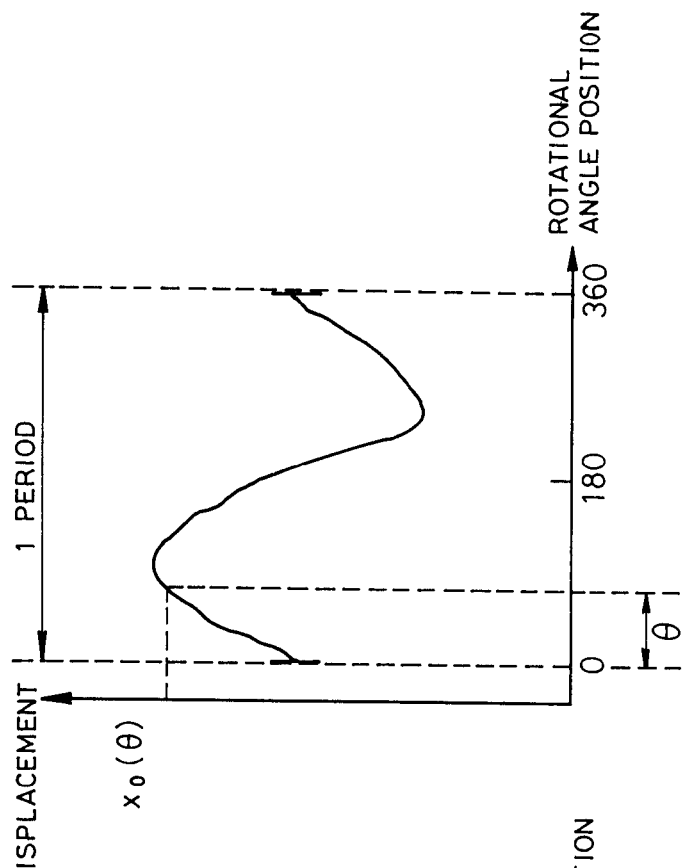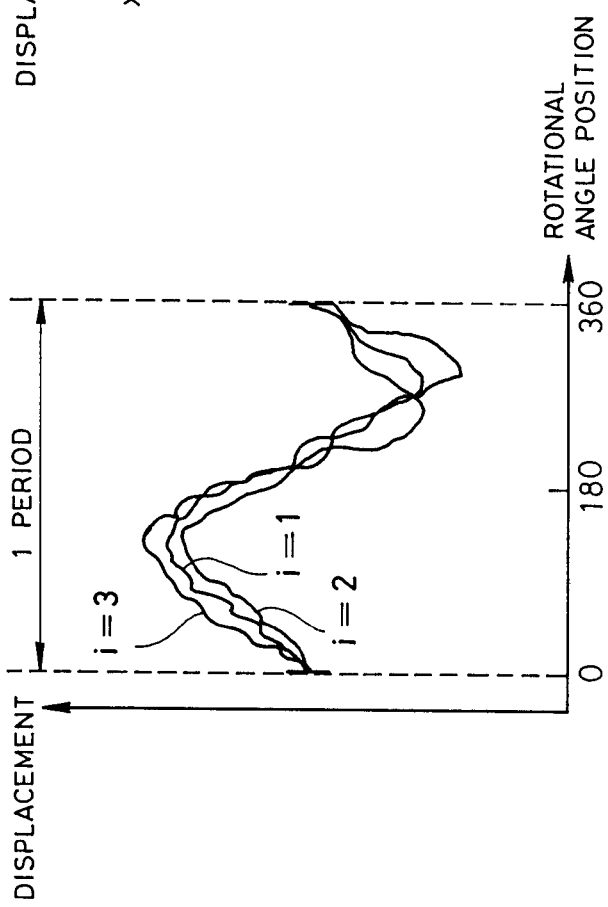

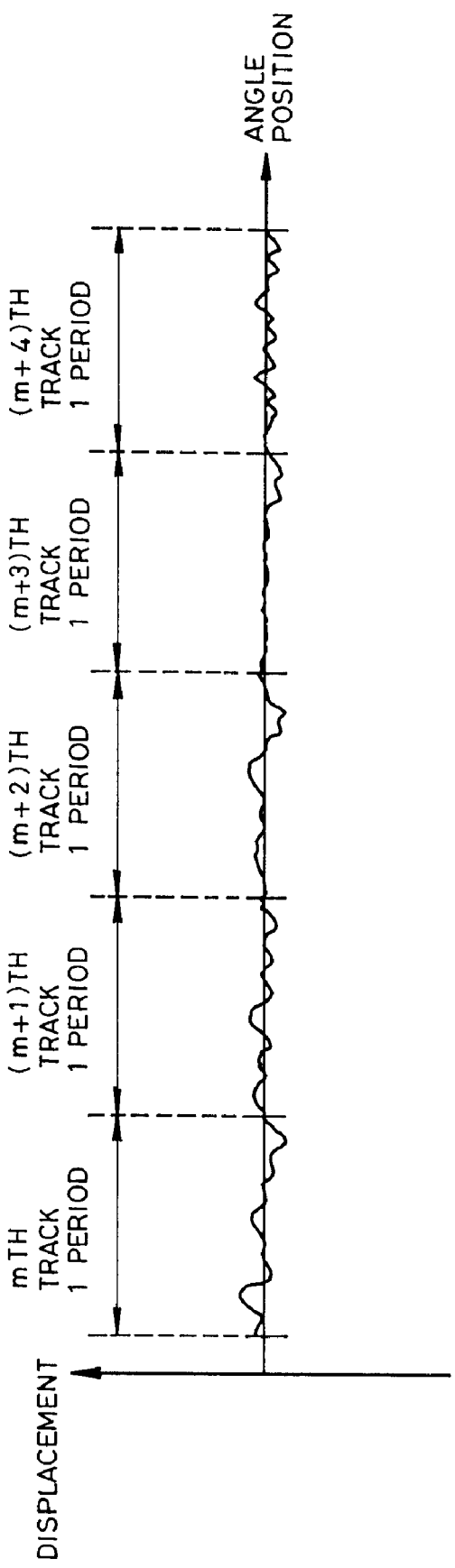

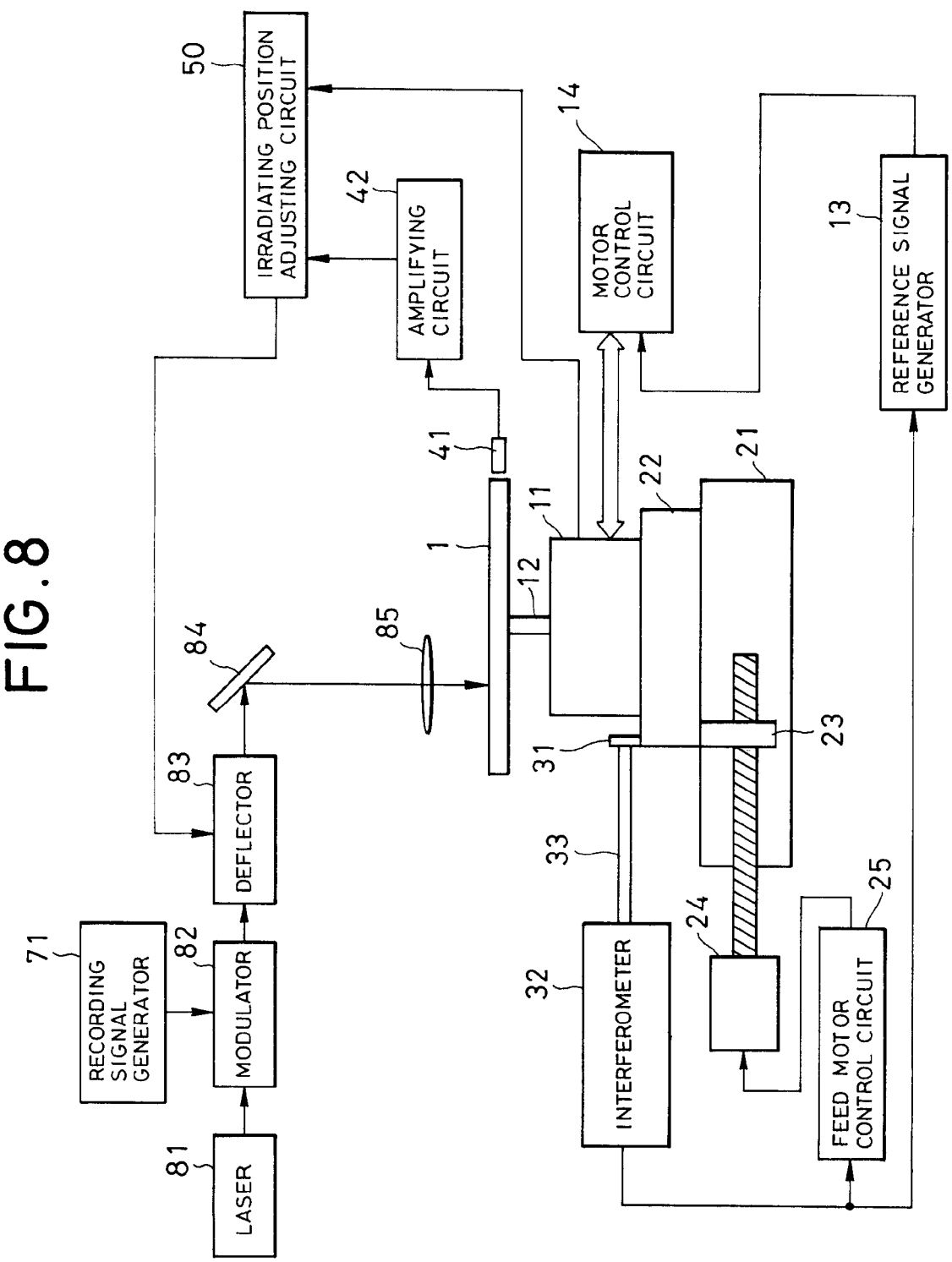

RECORDING APPARATUS OF MASTER DISCS OF OPTICAL DISCS

BACKGROUND OF THE INVENTION

1. Field of the Invention

The present invention relates to a recording apparatus of a master disk of optical discs, which adjusts a position where a recording beam is irradiated onto the master disc.

2. Description of Related Art

As a recording apparatus of a master disc of optical discs for recording a recording signal by irradiating a recording beam onto the master disc, an apparatus disclosed in Japanese Patent Kokai No. 6-131706 is known. In the apparatus mentioned above, a master disc of optical discs held by a rotary shaft of a spindle motor is rotated by the spindle motor, and a recording beam, for example, an electron beam is irradiated onto the master disc. A recording signal is recorded onto a recording surface of the master disc in this way.

As mentioned above, to record a recording signal, the master disc of optical discs is rotated by rotating the spindle motor, thereby to perform recording. However, if vibrations caused by the rotating motion of the spindle motor are propagated to the master disc, or a rotation fluctuation occurs in the spindle motor, then a problem can arise that a laser beam may not be irradiated onto a proper position on the master disc.

SUMMARY AND OBJECTS OF THE INVENTION

The invention was made in view of the foregoing problem, and it is an object of the invention to provide a recording apparatus of a master disc of optical discs, which can irradiate a recording beam to a preferable position on the master disc of optical discs.

According to the invention, there is provided a recording apparatus of a master disc of optical discs comprising: rotation driving means for rotating a rotary shaft to rotate a master disc; angle position detecting means for detecting an angle position in the rotating direction of the rotary shaft and generating an angle position signal; irradiating means for irradiating a recording beam to the master disc based on an information recording signal; and irradiating position control means for controlling an irradiating spot position of the recording beam on the master disc, wherein the irradiating position control means comprises displacement detecting means for detecting a displacement of the rotary shaft in the radial direction of the master disc and generating a displacement detection signal, deviation calculating means for calculating a present deviation at a present angle position from a reference position of the rotary shaft based on the angle position signal and the displacement detection signal, and irradiating position adjusting means for adjusting the irradiating spot position based on the present deviation.

According to one aspect of the invention, even when the vibration occurs in the rotary shaft, the recording beam can be irradiated on the preferable position on the master disc since the irradiating spot position is adjusted based on the present deviation.

According to another aspect of the invention, even when the rotation fluctuation occurs in the spindle motor, the recording beam can be irradiated on the preferable position on the master disc since the irradiating spot position is adjusted based on a present deviation phase difference.

BRIEF DESCRIPTION OF THE DRAWINGS

FIG. 4 is a flowchart showing a subroutine to calculate a present deviation $\Delta x(\theta)$ of the rotary shaft and control an irradiating spot position;

FIG. 5 is a graph showing a relationship between an angle position of the rotary shaft and a displacement detection signal which is generated from a displacement sensor;

FIG. 6A is a graph showing displacements of one period in an overlapped manner, using the relationship between the angle position and the displacement shown in FIG. 5 by setting a predetermined angle position as a reference, and FIG. 6B is a graph showing a reference displacement $x_0(\theta)$ calculated by averaging the displacements of one period shown in the graph of FIG. 6A with respect to the angle position, respectively;

FIG. 7 is a graph showing the present deviation $\Delta x(\theta)$ obtained by calculating a difference between a present displacement $x(\theta)$ obtained from the displacement detection signal which is generated from the displacement sensor and the reference displacement $x_0(\theta)$ shown in FIG. 6B;

FIG. 8 is a block diagram showing the second embodiment of the recording apparatus of a master disc of optical discs according to the invention;

FIG. 14 is a block diagram showing the fourth embodiment of the recording apparatus of a master disc of optical discs according to the invention; and.

DETAILED DESCRIPTION OF THE PREFERRED EMBODIMENTS

Embodiments of the invention will now be described with reference to the drawings.

Figure 1:
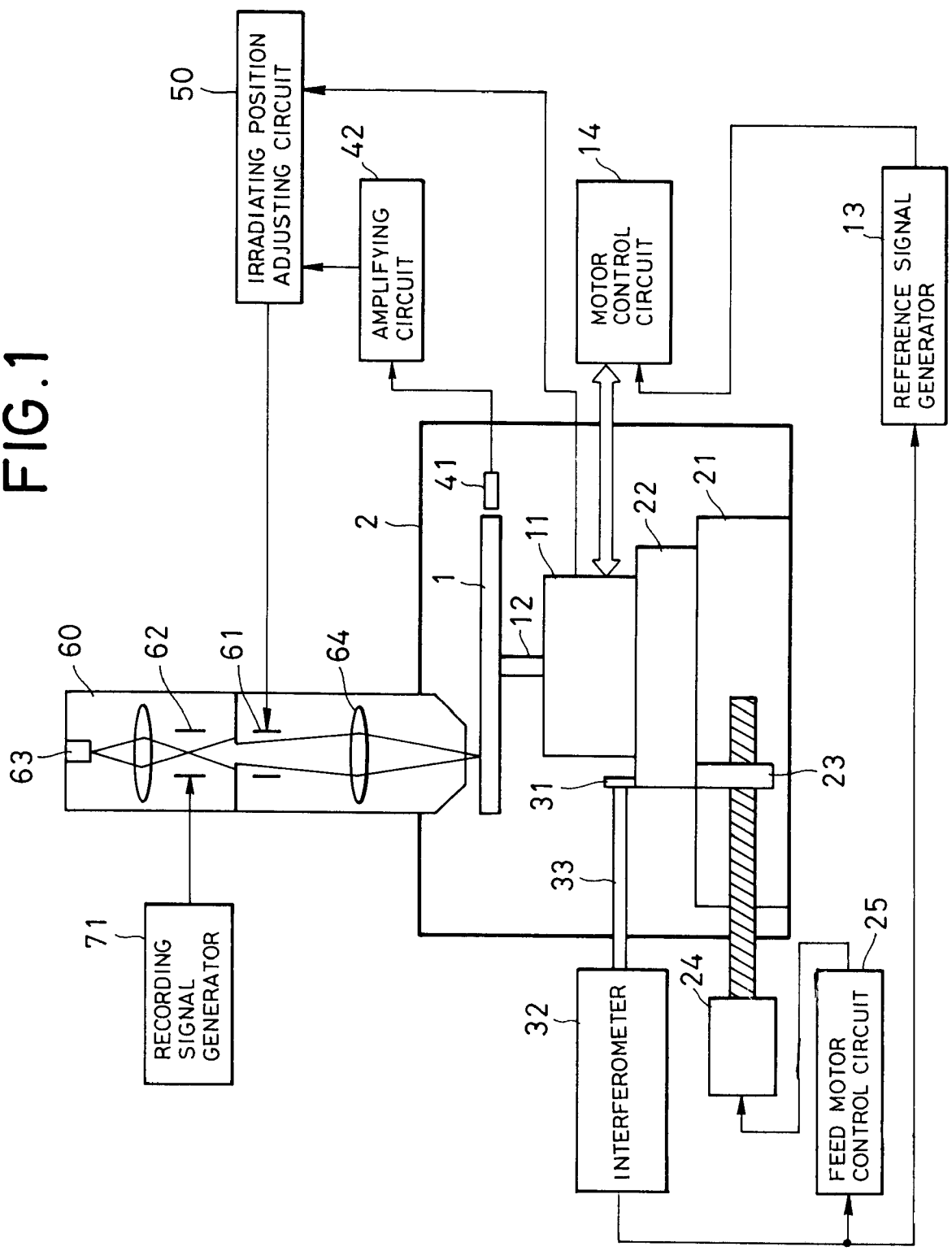
FIG. 1 is a block diagram showing the first embodiment of a recording apparatus of a master disc of optical discs according to the invention.

FIG. 1 shows the first embodiment of the recording apparatus of a master disc of optical discs according to the invention.

A master disc of optical discs 1 is held on a turntable (not shown) of a rotary shaft 12 which is rotated by a spindle motor 11. A reference pulse signal is supplied from a reference signal generator 13 to a motor control circuit 14. The motor control circuit 14 supplies a driving control signal to the spindle motor 11 so as to rotate the spindle motor 11 at a rotational speed according to the supplied reference pulse signal.

At the bottom of a vacuum chamber 2, there is provided a stage constituted by a stage base portion 21 and a stage movable portion 22. The spindle motor 11 is mounted on the stage movable portion 22 provided on the stage base portion 21. The stage movable portion 22 is moved in the horizontal direction due to a rotation of a feed motor 24 coupled to the stage movable portion 22 through a screw mechanism 23, so that the spindle motor 11 is moved in the horizontal direction. A reflecting mirror 31 is fixed to an edge portion of the stage movable potion 22. The reflecting mirror 31 reflects a laser beam 33 for length measurement which is generated from a interferometer 32 and allows the laser beam to enter a detecting portion (not shown) of the interferometer 32. The interferometer 32 transmits a detection signal corresponding to a distance between the reflecting mirror 31 and the detecting portion of the interferometer 32 and supplies it to a feed motor control circuit 25. The detection signal is used as position information of the irradiating spot of the recording beam on the master disc of optical discs, which will be explained later. The feed motor control circuit 25 supplies a control signal to the feed motor 24 based on the supplied detection signal so as to move the stage movable portion 22. When a recording format of the master disc of optical discs to be recorded has the CLV (Constant Linear Velocity) mode, the detection signal which is generated from the interferometer 32 is also supplied to the reference signal generator 13 in order to change the rotational speed of the spindle motor 11 in accordance with a radial position of the irradiating spot on the master disc of optical discs 1.

A displacement sensor 41 is provided near the side edge portion of the master disc of optical discs 1. A detection signal of the displacement sensor 41 is supplied to an amplifying circuit 42. The amplifying circuit 42 detects an electrostatic capacitance of a flat type capacitor formed by the opposite surfaces of the displacement sensor 41 and the side edge portion of the master disc of optical discs 1, thereby generating a signal (below, referred to as a displacement detection signal) corresponding to a distance between the displacement sensor 41 and the side edge portion of the master disc of optical discs 1. Thus, the displacement detection signal represents a displacement of the rotary shaft 12 in a radial direction of the master disc 1.

When the spindle motor 11 is rotated, a rotary encoder (not shown) for generating a pulse signal (below, referred to as an angle pulse signal) every predetermined rotational angle is provided. The angle pulse signal is supplied to an irradiating position adjusting circuit 50 together with the displacement detection signal. The irradiating position adjusting circuit 50 supplies a control signal to control an electric field which is formed by deflecting electrodes 61, which will be described later, to the deflecting electrodes 61. A recording signal generator 71 generates a recording signal to be recorded on the master disc of optical discs 1, thereby controlling blanking electrodes 62. The blanking electrodes 62 form the electric field according to the recording signal to be recorded.

In an electron beam column 60, an electron beam which is generated from an electron beam source 63 is converted to a beam corresponding to the recording signal by the electric field which is formed by the blanking electrodes 62. After the irradiating position was controlled by the electric field formed by the deflecting electrodes 61, the beam is converged by an objective lens 64 and is irradiated onto the master disc of optical discs 1.

The master disc 1, spindle motor 11, rotary shaft 12, stage base portion 21, stage movable portion 22, and displacement sensor 41 are provided in the vacuum chamber 2. The electron beam column 60 is fixed to the upper portion of the vacuum chamber 2 so that an emitting port of the electron beam is positioned in the vacuum chamber 2.

Figure 2:
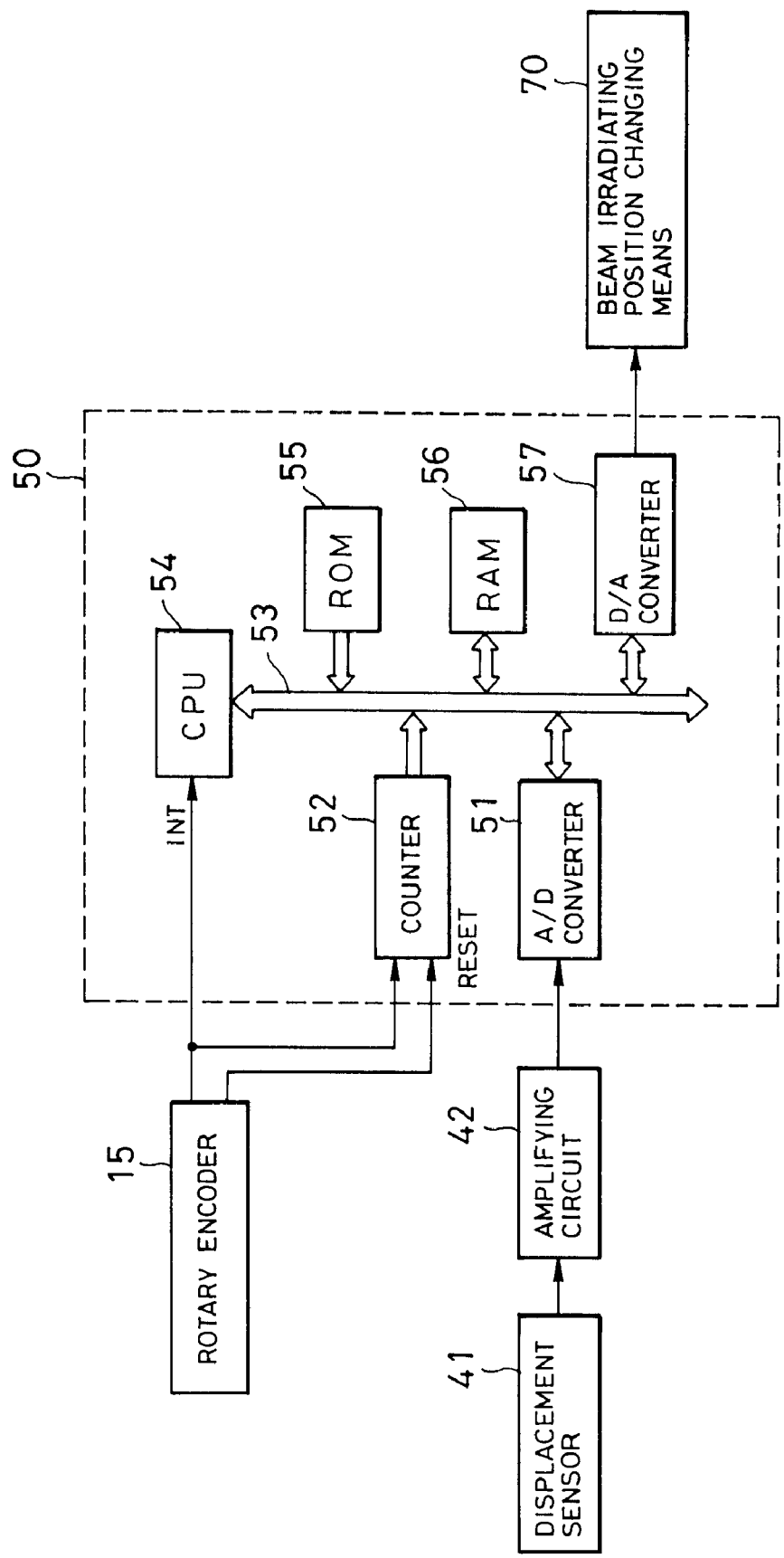
FIG. 2 is a block diagram showing an irradiating position adjusting circuit for adjusting an irradiating position of the recording apparatus of the master disc shown in FIG. 1.

FIG. 2 shows an irradiating position adjusting circuit for adjusting the irradiating position of the recording apparatus of a master disc of optical discs shown in FIG. 1.

The displacement detection signal which is generated from the amplifying circuit 42 of the displacement sensor 41 is supplied to an A/D converter 51. The A/D converter 51 converts the supplied signal to a digital signal and supplies it to an input/output bus 53.

The angle pulse signal which is generated from the rotary encoder 15 is supplied to an interruption input terminal of a CPU 54 and is also supplied to a counter 52. An origin pulse signal indicative of an origin of the angle position is also generated from the rotary encoder 15 and is supplied to a reset terminal of the counter 52. The counter 52 accumulates the number of pulses of the angle pulse signal and generates a digital value according to the rotational angle of the master disc of optical discs 1. An output signal which is generated from the counter 52 is supplied to the input/output bus 53. When the origin pulse signal is supplied to the reset terminal of the counter 52, the accumulation value is set to an initial value, for example, "0".

The input/output bus 53 allows a data signal or an address signal to be supplied and generated to/from the CPU 54. An ROM 55, an RAM 56, and a D/A converter 57 are connected to the input/output bus 53. A program to adjust the position of the irradiating spot on the master disc of optical discs in accordance with flowcharts, which will be explained in FIGS. 3 and 4, has been stored in the ROM 55. The D/A converter 57 converts a control signal which is generated from the CPU 54 and is used to adjust the position of the irradiating spot into an analog signal and supplies it to beam irradiating position changing means 70, deflecting electrodes 61 in, for example, the apparatus shown in FIG. 1, and a deflector 83 in an apparatus shown in FIG. 8, which will be described later.

Figure 3:
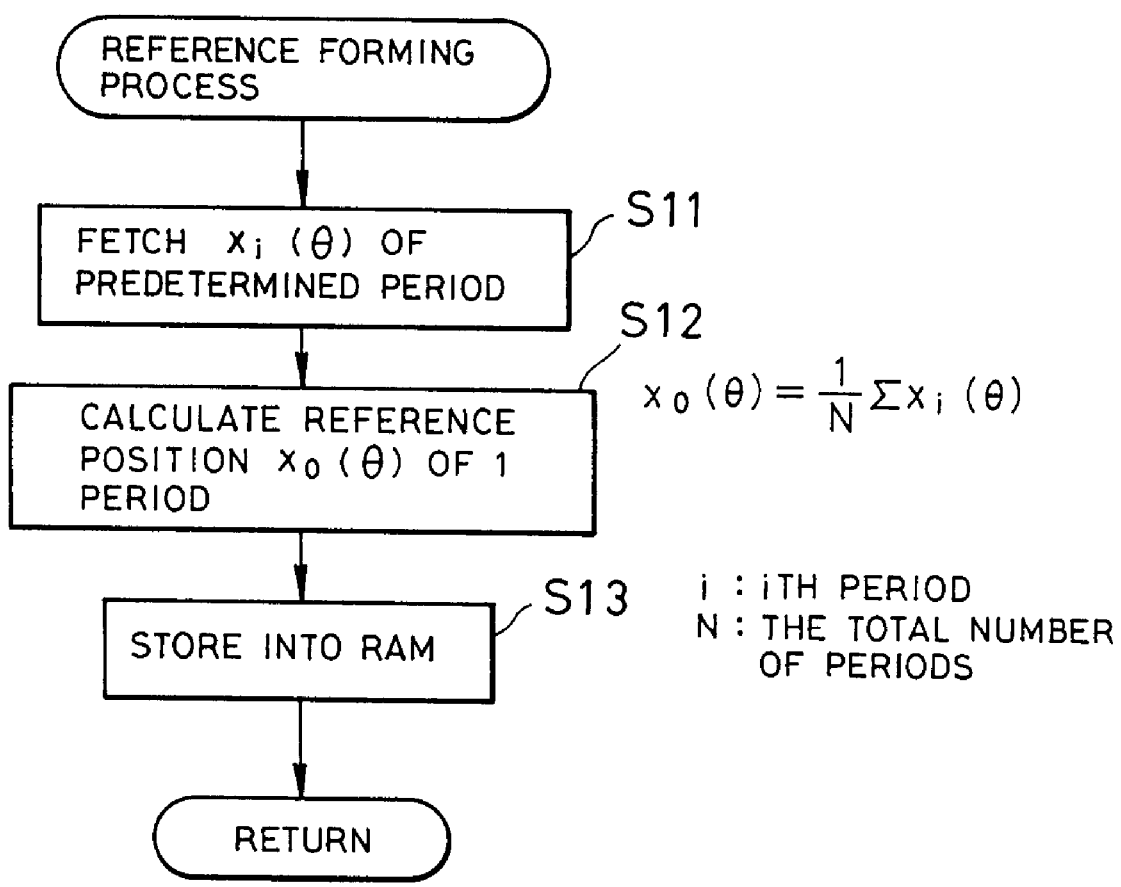
FIG. 3 is a flowchart showing a subroutine to calculate a reference position $x_0(\theta)$ of a rotary shaft.

FIG. 3 is a flowchart showing a subroutine to calculate the reference position of the rotary shaft 12.

First, the distance between the side edge portion of the master disc of optical discs and the displacement sensor 41, namely, a displacement $x_i(\theta)$ of the rotary shaft is fetched from the A/D converter 51 only for predetermined periods N in correspondence to a rotational angle position $\theta$ fetched from the counter 52 (step S11). As shown in FIG. 5, the relation between the rotational angle position $\theta$ and displacement $x_i(\theta)$ is shown by an overlap of repetitive components and non-repetitive components. The repetitive components are caused due to, for example, an eccentricity of the rotary shaft. The non-repetitive components are caused by the rotation fluctuation which occurs, for example, at the time of rotation of the spindle motor and have irregular values every period.

A mean value of one period is subsequently calculated by, for example, the following equation (1) (step S12).

$$X_0(\theta) = \frac{1}{N}\sum_{i=1}^{N} X_i(\theta) \qquad (1)$$

where,
  i represents i-th period;
  N represents the total number of fetched periods; and
  $x_i(\theta)$ represents the displacement at the rotational angle position $\theta$ in the i-th period.

As shown in FIG. 6A, according to the mean calculating process, among the displacements $x_i(\theta)$ fetched for the predetermined periods N in step S11, after the displacements $x_i(\theta)$ of an amount of one period were rearranged based on a predetermined rotational angle position, for example, $\theta=0°$ as a reference, as shown in FIG. 6B, the sum of the displacements $x_i(\theta)$ for the periods 1 to N at the rotational angle position $\theta$ is divided by the predetermined periods N. The symbol $x_0(\theta)$ denotes a value obtained by extracting the repetitive components. The calculated $x_0(\theta)$ is stored as a reference position of the rotary shaft into the RAM 56 (step S13). The subroutine is finished.

FIG. 4 shows a subroutine for calculating a present deviation of the rotary shaft and controlling an irradiating spot position.

First, the present rotational angle position $\theta$ is fetched from a rotary encoder 15 (step S21). Subsequently, a present displacement $x(\theta)$ of the rotary shaft is fetched from the A/D converter 51 (step S22). A reference position $x_0(\theta)$ corresponding to the present rotational angle position $\theta$ fetched in step S21 is read out from the RAM 56 (step S23). The reference position $x_0(\theta)$ is calculated in accordance with the flowchart shown in FIG. 3 mentioned above and stored. Subsequently, a present deviation $\Delta x(\theta)$ is obtained by subtracting the reference position $x_0(\theta)$ from the present displacement $x(\theta)$ (step S24). As shown in FIG. 7, the calculated present deviation $\Delta x(\theta)$ is a deviation obtained by extracting the non-repetitive component mentioned above. A control signal corresponding to the present deviation $\Delta x(\theta)$ is generated from the D/A converter 57 and supplied to the deflecting electrodes 61 (step S25). The present subroutine is finished.

FIG. 8 shows the second embodiment of the recording apparatus of a master disc of optical discs according to the invention.

In the recording apparatus of a master disc of optical discs, a recording signal is recorded onto the master disc of optical discs by a laser beam. Elements corresponding to the elements of the recording apparatus shown in FIG. 1 are designated by the same reference numerals.

A laser beam emitted from a laser light source 81 enters a modulating element (not shown) of a modulator 82. The recording signal to be recorded onto the master disc of optical discs is supplied from a recording signal generator to the modulator 82. The recording signal converts the incident laser beam into a modulation laser beam by changing a refractive index of the modulating element of the modulator 82. The modulation laser beam enters a deflecting element (not shown) of the deflector 83. A control signal which is generated from the irradiating position adjusting circuit 50 is supplied to the deflector 83. By changing a refractive index of the deflecting element of the deflector 83, an emitting direction of the modulation laser beam is controlled. The modulation laser beam emitted from the deflector 83 is converged by an objective lens after its optical path has been changed by a mirror 84. The converged laser beam is irradiated onto the recording surface on the master disc of optical discs.

Figure 9:
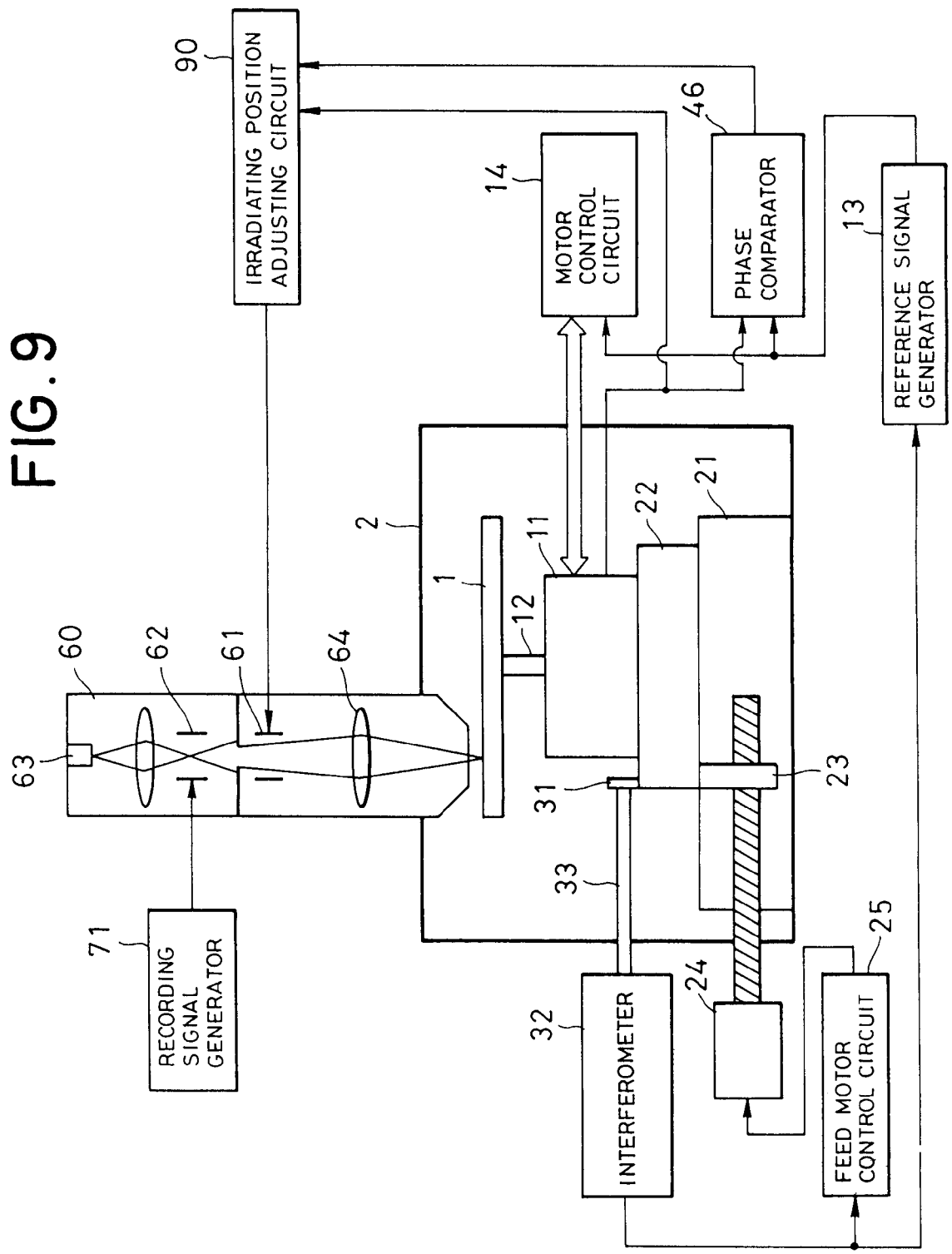
FIG. 9 is a block diagram showing the third embodiment of the recording apparatus of a master disc of optical discs according to the invention.

FIG. 9 shows the third embodiment of the recording apparatus of a master disc of optical discs according to the invention. Elements corresponding to the elements of the recording apparatus shown in FIGS. 1 and 8 are designated by the same reference numerals.

Figure 13:
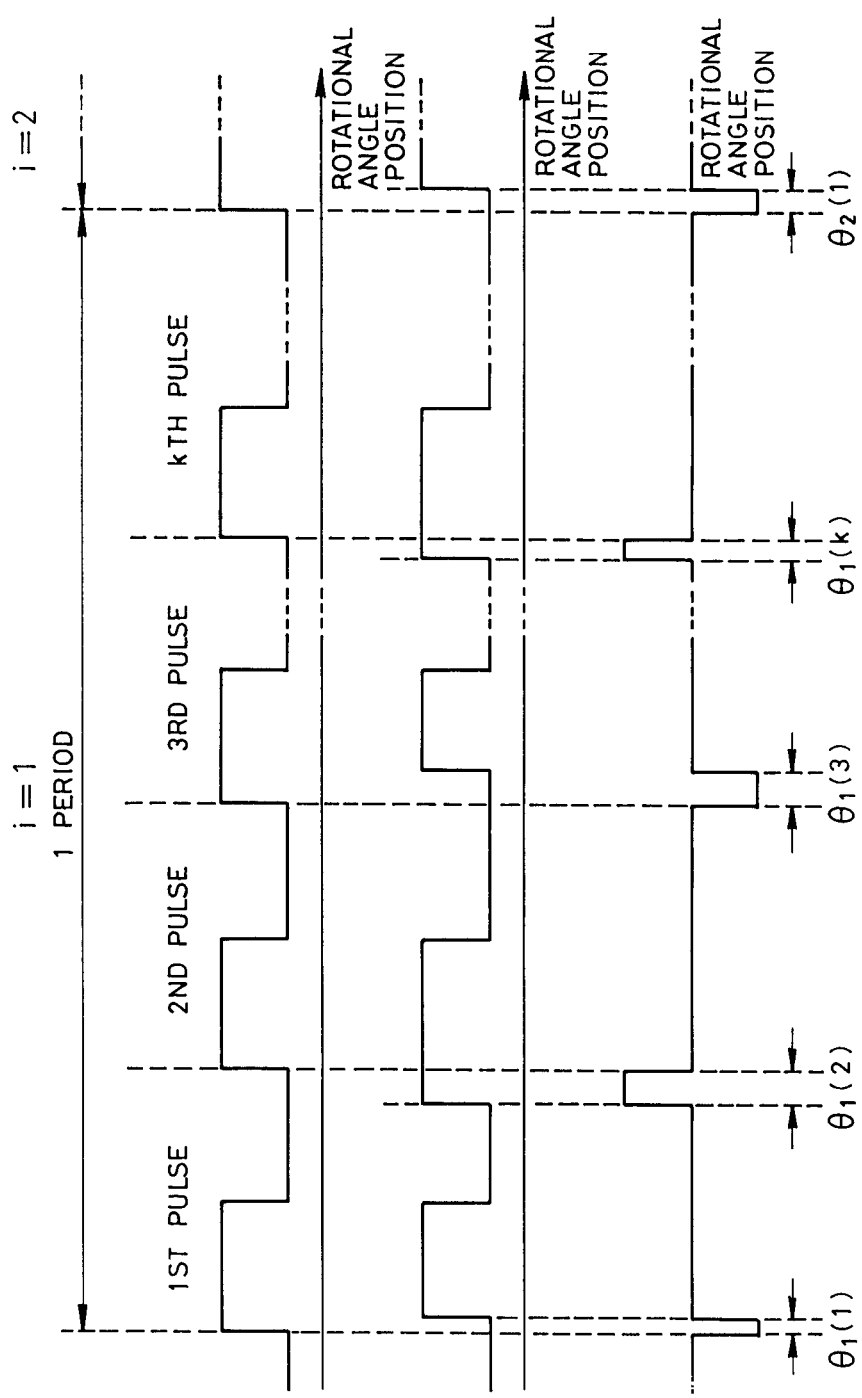
FIGS. 13A to 13C are graphs showing a reference pulse signal which is generated from a reference signal generator, an angle pulse signal which is generated from a rotary encoder, and a phase difference signal which is generated from the phase comparator, respectively.

A reference pulse signal to control a rotational speed of the spindle motor 11 is supplied from the reference signal generator 13 to the motor control circuit 14 and is also supplied to a phase comparator 46. The reference pulse signal is a signal obtained by generating a pulse of a predetermined width at every predetermined time interval as shown in FIG. 13A. An angle pulse signal which is generated from a rotary encoder (not shown) is also supplied to the phase comparator 46. The angle pulse signal is a pulse signal as shown in FIG. 13B and causes a phase deviation for the reference pulse signal by a rotational fluctuation of the spindle motor 11. The phase comparator 46 compares a phase of the reference pulse signal with that of the angle pulse signal, namely, compares a timing of a leading edge portion of the reference pulse signal with that of a leading edge portion of the angle pulse signal as shown in FIG. 13C. When the timing of the leading edge portion of the angle pulse signal is later than that of the leading edge portion of the reference pulse signal, the phase comparator 46 generates a negative pulse having a width corresponding to a phase difference. When the timing of the leading edge portion of the angle pulse signal is earlier than that of the leading edge portion of the reference pulse signal, the phase comparator 46 generates a positive pulse having a width corresponding to a phase difference. The phase difference signal generated from the phase comparator 46 and the angle pulse signal generated from the rotary encoder are supplied to an irradiating position adjusting circuit 90. The irradiating position adjusting circuit 90 generates a control signal to control the deflecting electrodes 61 based on the phase difference signal and the angle pulse signal.

Figure 10:
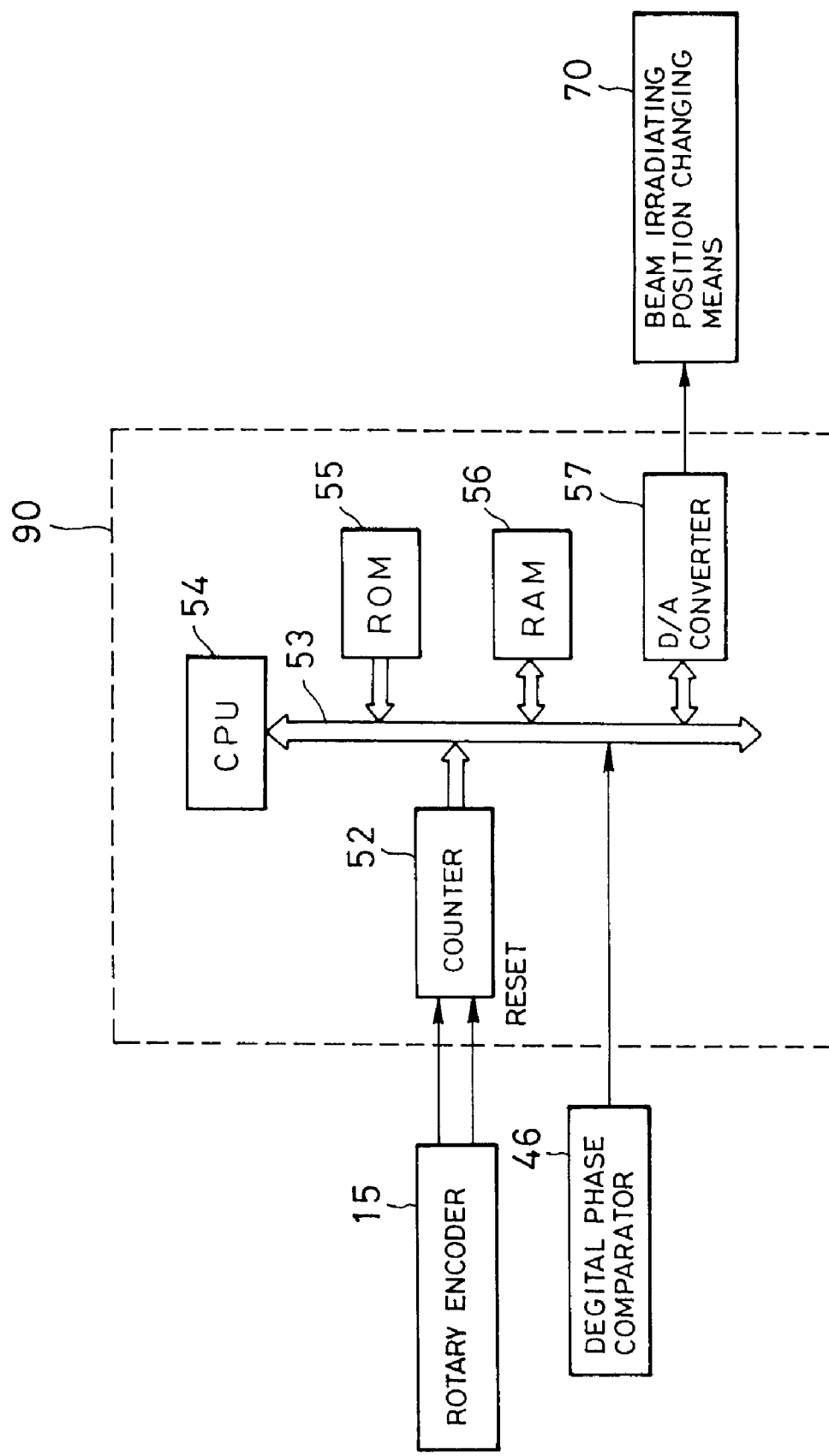
FIG. 10 is a block diagram showing an irradiating position adjusting circuit for adjusting the irradiating spot position of the recording apparatus shown in FIG. 9.

FIG. 10 shows the irradiating position adjusting circuit to adjust the irradiating spot position of the recording beam of the recording apparatus of a master disc of optical discs shown in FIG. 9. Elements corresponding to the elements of the irradiating position adjusting circuit shown in FIG. 2 are designated by the same reference numerals.

The angle pulse signal generated from the rotary encoder 15 and an origin pulse signal showing an origin of the rotational angle position are supplied to the counter 52. The counter 52 accumulates the number of pulses of the angle pulse signal and generates an accumulation value of the number of pulses according to the rotational angle of the master disc of optical discs 1. An output signal generated from the counter 52 is supplied to the input/output bus 53. When the origin pulse signal is supplied to a reset terminal of the counter 52, the accumulation value is set into an initial value, for example, "0". The accumulation value of the number of pulses mentioned above indicates the rotational angle position of the master disc of optical discs.

The phase difference signal which is generated from the phase comparator 46 is supplied to the input/output bus 53. In accordance with flowcharts which will be explained with reference to FIGS. 11 and 12, the CPU 54 supplies a control signal to adjust the position of the irradiating spot on the master disc of optical discs to beam irradiating position changing means 70, for example, to the deflecting electrodes 61 in the apparatus shown in FIG. 9 mentioned above or to the deflector 83 in an apparatus shown in FIG. 14, which will be explained later.

Figure 11:
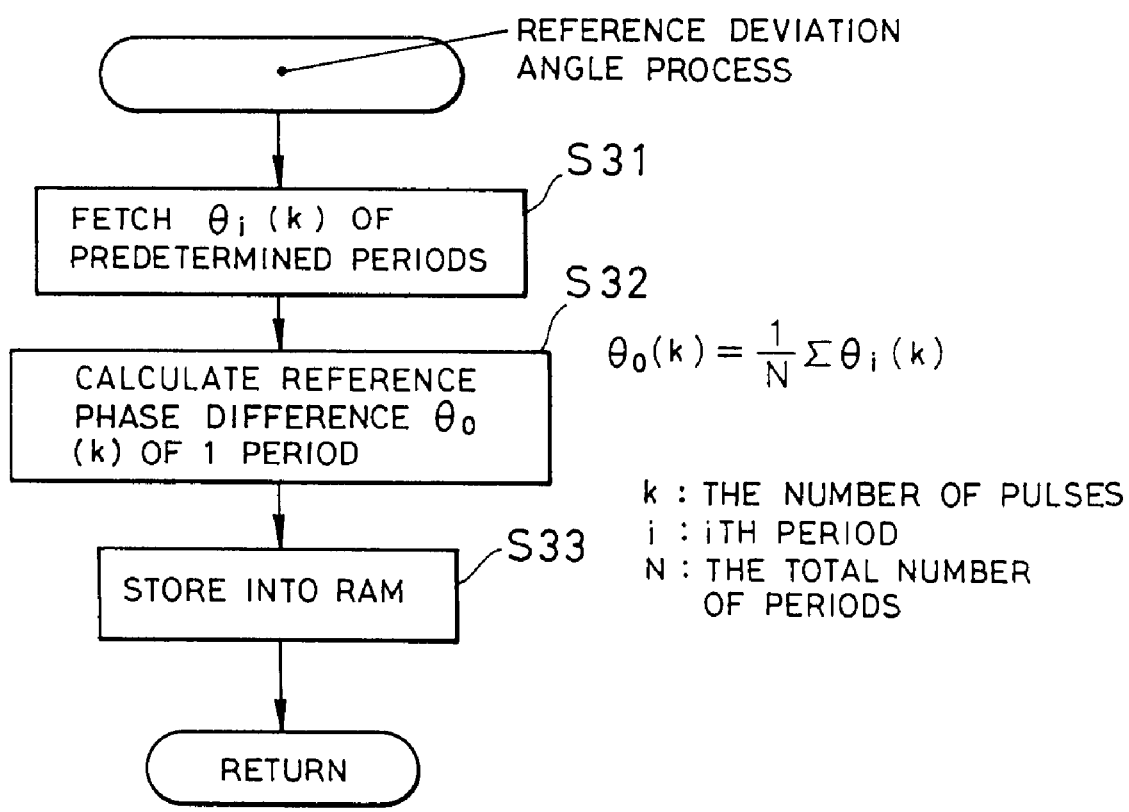
FIG. 11 is a flowchart showing a subroutine to calculate a reference phase difference from a phase difference signal which is generated from a phase comparator.

FIG. 11 shows a subroutine to calculate a reference phase difference from the phase difference signal which is generated from the phase comparator 46.

First, a phase difference $\theta_i(k)$ of predetermined periods N is fetched from the phase difference signal generated from the phase comparator 46 (step S31). As shown in FIGS. 13A to 13C, "i" denotes the i-th period and k indicates the k-th pulse in one period. It is also possible to substitute the rotational angle position e which is obtained from the angle pulse signal for "k" showing the number of the pulse. A mean value of one period is calculated by, for example, the following equation (2) (step S32).

$$\theta_0(k) = \frac{1}{N} \sum_{i=1}^{N} \theta_i(k) \quad (2)$$

In the mean calculating process, the sum of the phase differences $\theta_i(k)$ of the k-th pulses in the respective periods 1 to N is divided by the predetermined periods N. Subsequently, the calculated $\theta_0(k)$ is stored as a reference phase difference into the RAM 56 (step S33). The present subroutine is finished.

Figure 12:
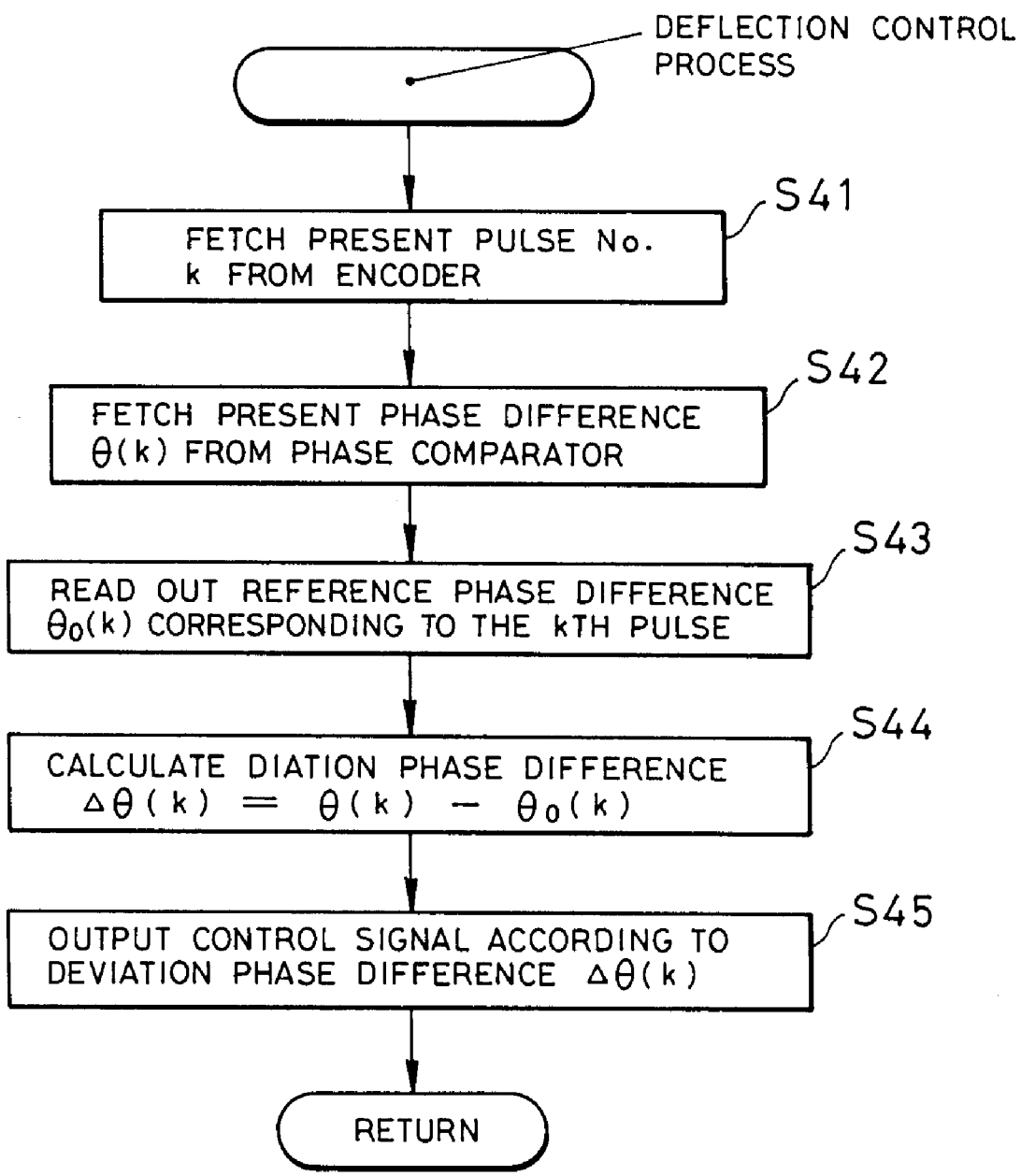
FIG. 12 is a flowchart showing a subroutine to calculate a present deviation phase difference and control the irradiating spot position.

FIG. 12 shows a subroutine for calculating a present deviation phase difference and controlling the irradiating spot position.

First, the accumulation value, namely, pulse No. k of the pulses at the present rotational angle position is fetched from the rotary encoder 15 (step S41). Subsequently, a present phase difference $\theta(k)$ is fetched from the phase comparator 46 (step S42). The reference phase difference $\theta_0(k)$ corresponding to the k-th pulse fetched in step S41 is read out from the RAM 56 (step S43). The reference phase difference $\theta_0(k)$ is calculated in accordance with the flowchart shown in FIG. 11 and stored. Subsequently, a present deviation phase difference $\Delta\theta(k)$ is obtained by subtracting the reference phase difference $\Delta\theta_0(k)$ from the present phase difference $\theta(k)$ (step S44). The calculated present deviation phase difference $\theta(k)$ is a difference obtained by extracting the non-repetitive component of the phase difference occurring due to the rotational fluctuation of the spindle motor. Subsequently, a control signal according to the present deviation phase difference $\Delta\theta(k)$ is generated from the D/A converter 57 to the deflecting electrodes 61 (step S45). The present subroutine is finished.

Figure 14:
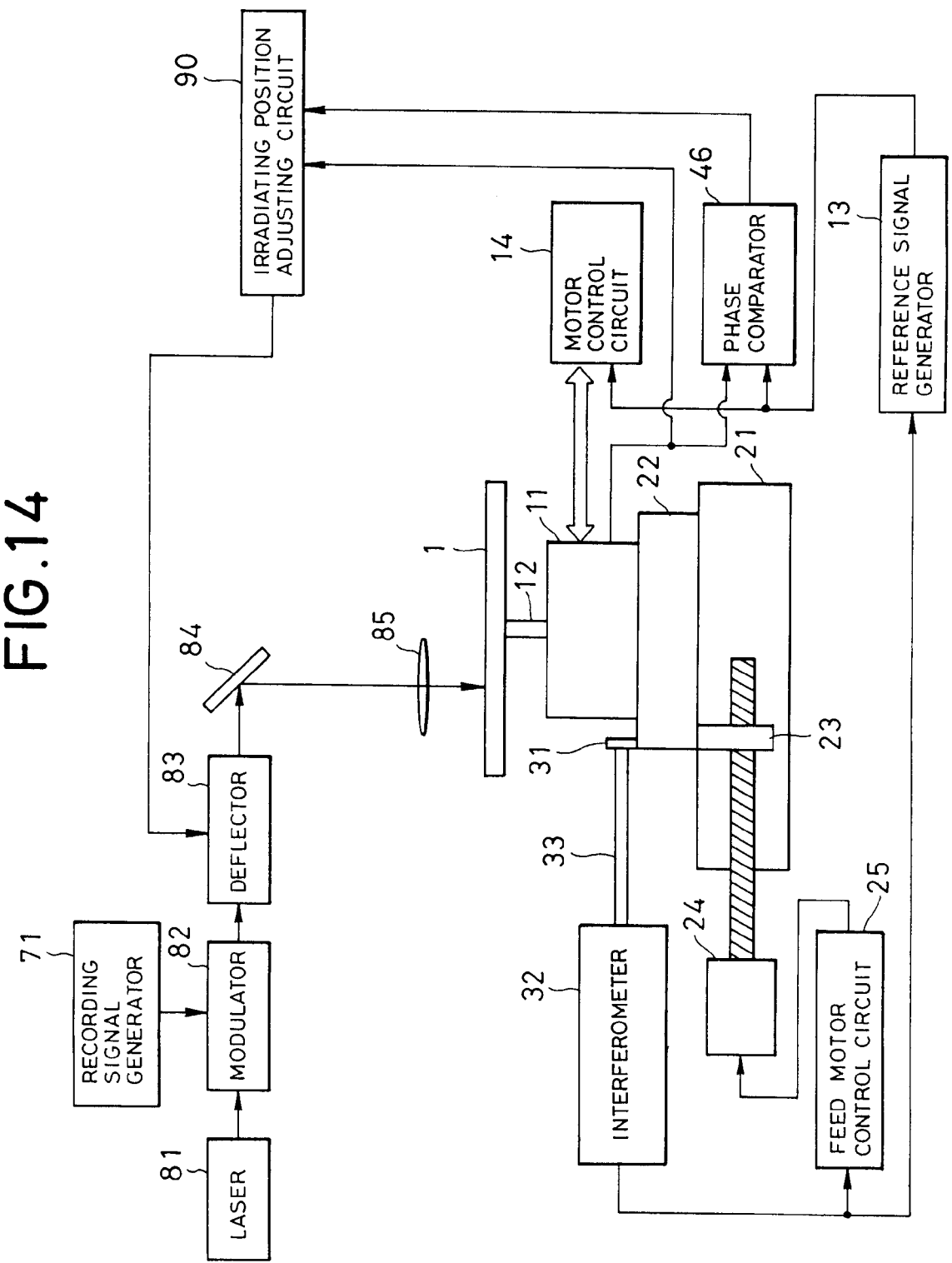

FIG. 14 shows a fourth embodiment of the recording apparatus of a master disc of optical discs according to the invention. Elements corresponding to the elements of the recording apparatus of a master disc of optical discs shown in FIGS. 1, 8, and 9 are designated by the same reference numerals.

The control signal which is generated from the irradiating position adjusting circuit 90 is supplied to the deflector 83. The deflector 83 controls the direction of the modulation laser beam modulated in the modulator 82 in accordance with the recording signal generated from the recording signal generator 71. The modulation laser beam is reflected by the mirror 84 and passes through an objective lens 85. After that, it is irradiated onto the master disc of optical discs.

Figure 15:
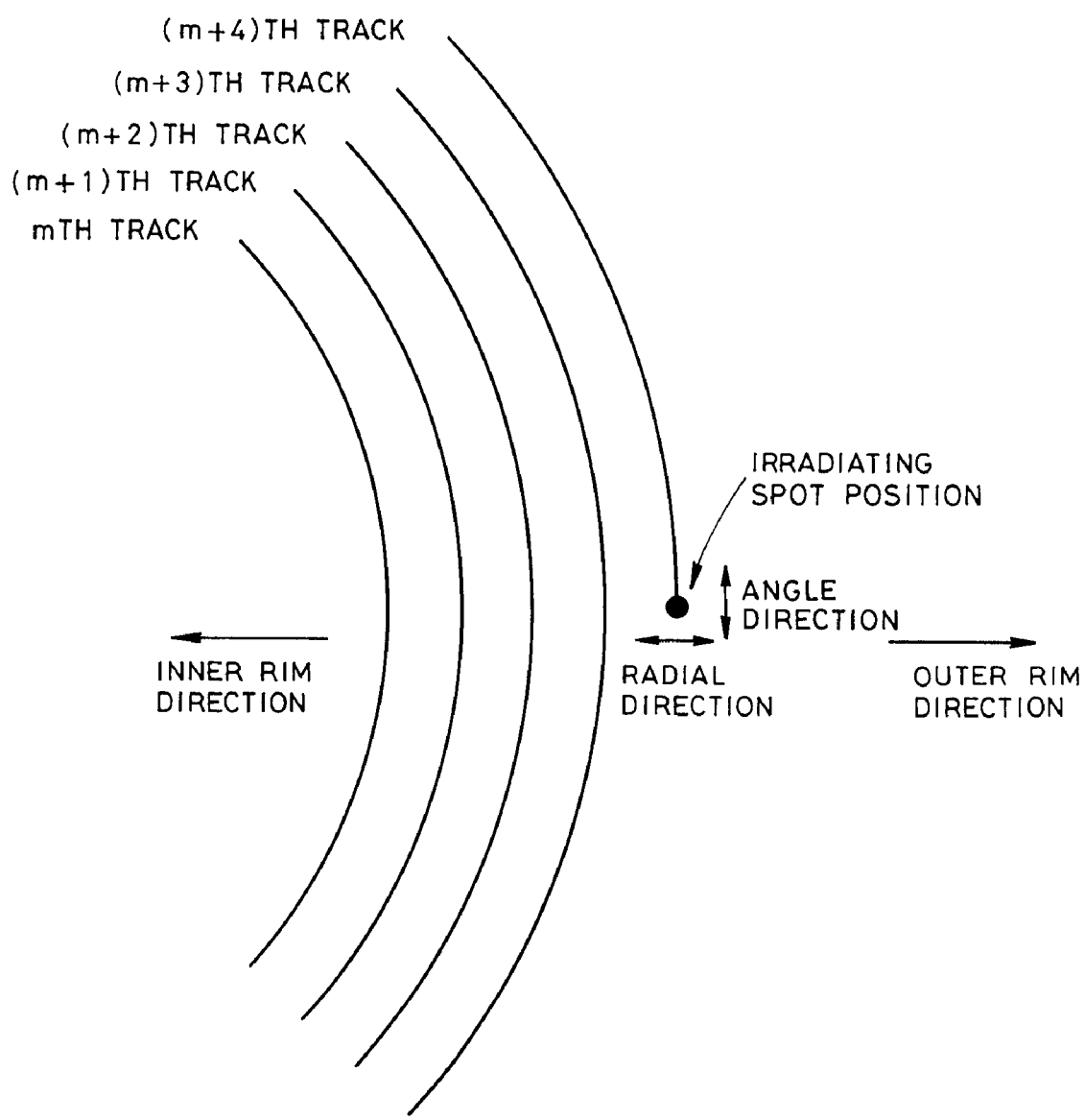
FIG. 15 is a diagram showing a locus of a recording beam which is irradiated onto a master disc of optical discs.

FIG. 15 shows a locus of the recording beam which is irradiated onto the master disc of optical discs.

The right side of the drawing on the paper shows an outer rim direction of the master disc of optical discs and the left side of the drawing on the paper shows an inner rim direction of the master disc of optical discs. By horizontally moving the stage movable portion 22, the irradiating spot position on the master disc of optical discs can be moved, for example, as shown in FIG. 15, it can be moved from the inner rim side to the outer rim side.

By the recording apparatus of master disc of optical discs shown in the first and second embodiments, the irradiating spot position can be adjusted in the radial direction in accordance with the non-repetitive component of the axial oscillation of the rotary shaft 12. By the recording apparatus of a master disc of optical discs shown in the third and fourth embodiments, the irradiating spot position can be adjusted in the angle direction in accordance with the non-repetitive component of the rotational fluctuation of the spindle motor 11.

In the above embodiments, when the recording format of the master disc of optical discs to be recorded is set to the CAV (constant Angular Velocity) mode, since the rotational speed of the spindle motor 11 is constant, in the subroutine shown in FIG. 3 is executed to calculate the reference position $x_0(\theta)$ at the rotational speed, prior to starting the processes of the subroutine shown in FIG. 4. When the processes of the subroutine shown in FIG. 4 are executed, the calculated reference position $x_0(\theta)$ is read out and the present deviation $x(\theta)$ can be calculated. When the recording format is set to the CLV mode, since the rotational speed of the spindle motor 11 changes in accordance with the irradiating spot position, before the process of the subroutine shown in FIG. 4 is started, the reference positions $x_0(\theta)$ are preliminarily calculated in accordance with the subroutine shown in FIG. 3 with respect to the whole range of the rotational speed necessary when the recording signal is recorded. The present deviation $x(\theta)$ can be calculated while reading out the reference position $x_0(\theta)$ corresponding to the rotational speed upon recording. The reference position $x_0(\theta)$ is calculated at every predetermined timing, for example, every track and the present deviation $x(\theta)$ can be calculated. Even when the subroutines shown in FIGS. 11 and 12 are executed, it will be obviously understood that the processes can be performed at the timings to execute the subroutines of FIGS. 3 and 4 mentioned above.

In the first and third embodiments, the structure has been shown in which the direction of the electron beam is controlled by supplying the control signal generated from the irradiating position adjusting circuit 50 to the deflecting electrodes 61. The electron beam, however, which is irradiated to the master disc of optical discs can be controlled by using a structure such that the control signal and the recording signal are supplied to a recording signal control circuit (not shown) and an electrode control signal to control an electric field developed between the blanking electrodes 62 is generated from the recording signal control circuit.

In the embodiments, the structure has been shown that the control signal generated from the irradiating position adjusting circuit 50 or 90 is supplied to the deflecting electrodes 61, deflector 83, and recording signal control circuit, thereby controlling the direction of the electron beam or laser beam and adjusting the irradiating position. However, by supplying the control signal to position adjusting means (not shown) of the objective lens, the objective lens is moved and the irradiating position can be adjusted.

With the recording apparatus of a master disc of optical discs according to the invention as described above, even when a vibration occurs in the rotary shaft, the recording beam can be irradiated to a preferable position on the master disc of optical discs, since the irradiating spot position is adjusted based on the present deviation.

According to another aspect of the invention, even when the rotational fluctuation occurs in the spindle motor, the recording beam can be irradiated to a preferable position on the master disc of optical discs, since the irradiating spot position is adjusted based on the present deviation phase difference.

What is claimed is:
1. A recording apparatus of a master disc of optical discs comprising:
rotation driving means for rotating a master disc of optical discs;
reference signal generating means for supplying a reference pulse signal to control a rotational speed of said master disc of optical discs to said rotation driving means;

angle pulse generating means for generating an angle pulse signal every predetermined angle in a rotating direction of said master disc of optical discs;

angle position calculating means for calculating an angle position in the rotating direction of said master disc of optical discs based on said angle pulse signal;

irradiating means for irradiating a recording beam onto said master disc of optical discs based on an information recording signal; and irradiating position control means for controlling an irradiating spot position of said recording beam on said master disc of optical discs, wherein said irradiating position control means comprises phase difference signal generating means for generating a phase difference signal according to a phase difference between a phase of said reference pulse signal and a phase of said angle pulse signal, deviation phase difference calculating means for calculating a present deviation phase difference at a present angle position from a reference phase difference based on said angle pulse signal and said phase difference signal, and irradiating position adjusting means for adjusting said irradiating spot position based on said present deviation phase difference.

2. An apparatus according to claim 1, wherein said deviation phase calculating means comprises:

reference phase difference calculating means for setting a phase difference which is calculated by averaging said phase differences fetched by sampling by an amount of predetermined periods and corresponds to an angle position of one period into the reference phase difference;

storing means for storing said reference phase difference; and subtracting means for performing a subtraction between the present phase difference and said reference phase difference and calculating said present deviation phase difference at the present angle position.

3. An apparatus according to claim 1, wherein said irradiating means comprises electron beam irradiating means using an electron beam as said recording beam, and said irradiating position control means has deflecting electrodes for deflecting the irradiating direction of said electron beam based on said present deviation phase difference.

4. An apparatus according to claim 1, wherein said irradiating means comprises laser beam irradiating means using a laser beam as said recording beam, and said irradiating position control means has a deflector for deflecting the irradiating direction of said laser beam based on said present deviation phase difference.

5. A recording apparatus of a master disc of optical discs comprising:

a motor which rotates a master disc of optical discs;

a reference signal generator which supplies a reference pulse signal to control a rotational speed of said master disc of optical discs to said motor;

a rotary encoder which generates an angle pulse signal every predetermined angle in a rotating direction of said master disc of optical discs;

an angle position calculator which calculates an angle position in the rotating direction of said master disc of optical discs based on said angle pulse signal;

an irradiator which irradiates a recording beam onto said master disc of optical discs based on an information recording signal; and an irradiating position adjusting circuit which controls an irradiating spot position of said recording beam on said master disc of optical discs, wherein said irradiating position adjusting circuit comprises:

a phase comparator which generates a phase difference signal according to a phase difference between a phase of said reference pulse signal and a phase of said angle pulse signal, a deviation phase difference calculator which calculates a present deviation phase difference at a present angle position from a reference phase difference based on said angle pulse signal and said phase difference signal, and an irradiating position adjuster which adjusts said irradiating spot position based on said present deviation phase difference.

6. An apparatus according to claim 5, wherein said deviation phase calculating means comprises:

a reference phase difference calculator which sets a phase difference which is calculated by averaging said phase differences fetched by sampling by an amount of predetermined periods and corresponds to an angle position of one period into the reference phase difference;

a storage device which stores said reference phase difference; and a subtractor that performs a subtraction between the present phase difference and said reference phase difference and calculating said present deviation phase difference at the present angle position.

7. An apparatus according to claim 5, wherein said irradiator comprises an electron beam irradiator using an electron beam as said recording beam, and said irradiating position adjusting circuit has deflecting electrodes for deflecting the irradiating direction of said electron beam based on said present deviation phase difference.

8. An apparatus according to claim 5, wherein said irradiator comprises a laser beam irradiator using a laser beam as said recording beam, and said irradiating position adjusting circuit has a deflector for deflecting the irradiating direction of said laser beam based on said present deviation phase difference.

* * * * *